Patented June 1, 1943

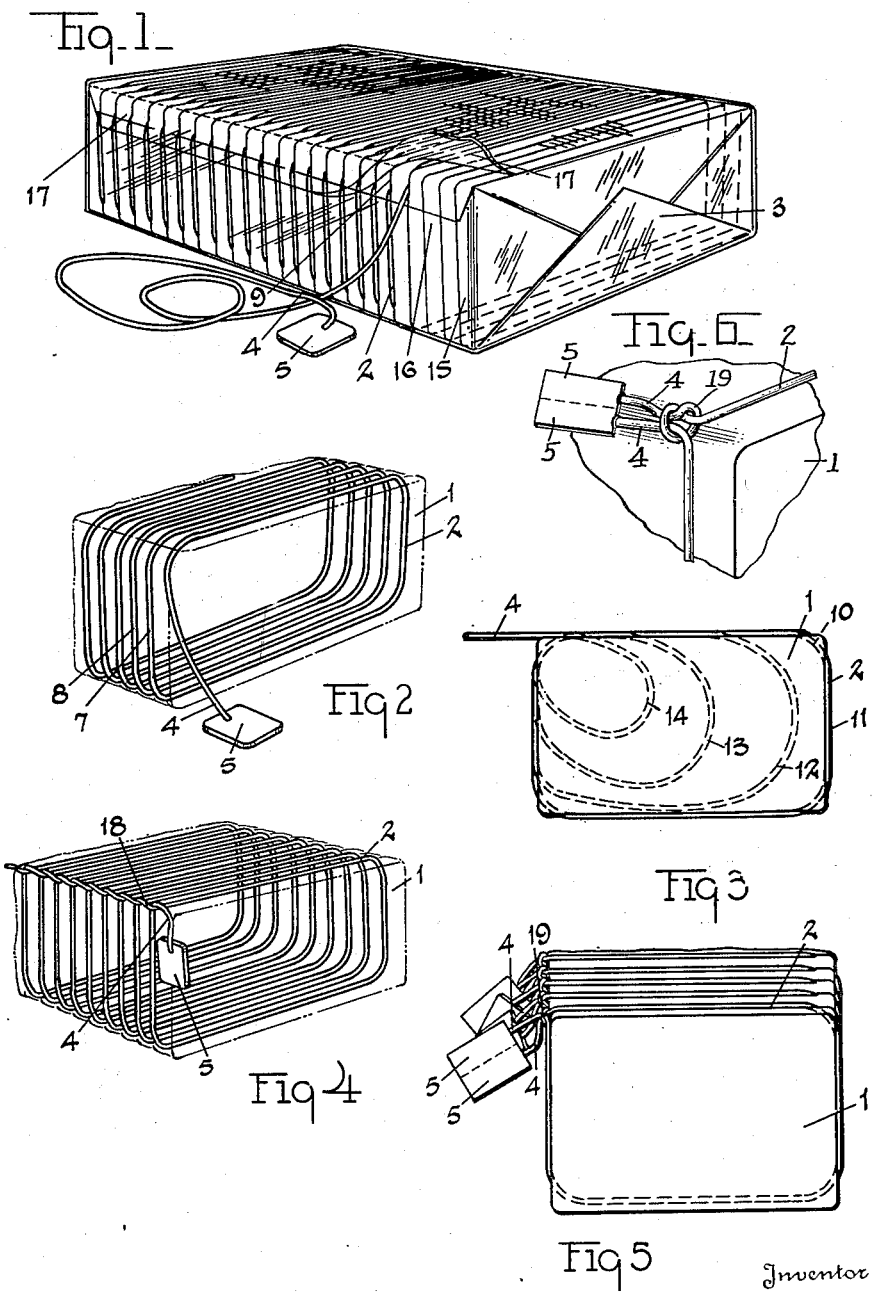

2,320,386

UNITED STATES PATENT OFFICE 2,320,386

PARTITIONING MEANS FOR PARTIBLE BODIES

Cale J. Schneider, Toledo, Ohio

Application February 25, 1939, Serial No. 258,501

9 Claims. (Cl. 31—22)

My invention relates to the art of partitioning or dividing a body into portions or parts of a desired and usable size and shape. The invention particularly relates to a partitioning means for a partible body which is readily adaptable for use in connection with bodies, such as bodies of cheese, cereal mush, pressed comminuted meat, butter, cake, frozen confection, putty, grease, and the like.

The invention has for one of its broader objects to provide an article of manufacture having a partible body and a partitioning means therefor and associated therewith in a position for immediate and ready utilization. In that sense, the invention has for an object to provide a partitioning means that is assembled or packaged with a commercially sized and shaped partible body, during the production or preparation processes of said body for delivery to the trade. Thus, the partitioning means of my invention is individual to each separate body, and my invention has for a further object to provide a partitioning means of an insignificant cost which, after having served its function, may be discarded and easily disposed of.

Another object of the invention is to provide a body partitioning means which includes, in its embodiment, a strand, such as a strand formed from cotton, linen, wool, paper, Cellophane, metal foil, metal, or from other like pliable materials from which strands may be formed, together with a means, connected to said strand, for moving the strand through the body with which it is associated and thereby effect the partition of the body along a desired plane of partition. The last-named means may be embodied advantageously in an integral extension of said strand. Said means may include a manually seizable element which, when provided, facilitates the manipulation of said strand to partition the body.

A further object of the invention is to provide an article of manufacture having a partible body and a partitioning means therefor including a strand disposed adjacent to a surface of said body and extending linearly in the plane of the desired partition of said body. Thus, when the strand is moved through the body, the body will be partitioned. If desired, the strand may be disposed to partition a predetermined and measured amount of the material from the body, when the strand is moved therethrough. Thus, the invention may be used to advantage by retailers and distributors of measured portions of bodies, such as pound units of a body.

The invention has for a particular object to provide an article of manufacture having a partible body which has been partially parted in a desired plane or partition thereof, a partitioning strand disposed in said partial parting and a means connected to said strand for moving the same through the body to complete the partition thereof. By the provision of the foregoing described relation of strand and body, the strand is supported by said body in a predetermined relation thereto and to the plane of ultimate partition, and the body may be handled freely without danger of disturbing said relation.

Another particular object of the invention is to provide an article of manufacture having a partible body and a partitioning means including a strand embedded in said body and a means connected to said strand extending from said body for moving the strand through the body to partition the same. Utilization of this provision of my invention provides not only for the supporting of the strand in a predetermined relation to the body but, also, makes the formation of the body and the allocation of the strand with reference thereto, common incidents of the same production operation, reducing, thereby, the otherwise necessary separate handling of the body and strand in production and the costs incidental thereto.

A still further particular object of the invention is to provide an article of manufacture having a partible body and a partitioning means therefor including a strand disposed in encircling linear relation about said body and, in a sense, confining said body therewithin, said strand being connected to a means for moving the strand through the body to partition the same. As is illustrated hereinafter, the means for moving the strand may be connected to one end of the bight or noose formed by the encircling strand and, when moved, the strand produces a gradually closing snare action on and through the body to partition the same into portions located on either side of said encircling strand.

The invention consists in other features and advantages which will appear from the following description and upon examination of the drawing. Structures containing the invention may partake of different forms and still embody the invention. To illustrate practical applications of the invention, I have selected a preferred form of a partitioning means for partible bodies and certain modified forms thereof, as examples of the various structures and details thereof that contain the invention and shall describe the selected forms hereinafter, it being understood that variations may be made without departing from the spirit of the invention. The particular forms selected are shown in the accompanying drawing and described hereinafter.

Fig. 1 of the accompanying drawing illustrates a perspective view of the preferred form of an embodiment of my invention and in which a transparent wrapper is shown largely enclosing the partitioning means and the body of the partible material. Fig. 2 illustrates, diagrammatically, the relation of the partitioning means shown in Fig. 1 to the body of partible material. Fig. 3 illustrates, diagrammatically, by illustration of various positions, the progressive movement of the partitioning means of Fig. 1 through the body of partible material. Fig. 4 illustrates, diagrammatically, the partitioning means of Fig. 1 applied to the body of the partible material, in a different manner than that shown in Fig. 1. Fig. 5 is a perspective view and illustrates a modified form of an embodiment of the partitioning means of my invention. Fig. 6 is an enlarged view of a portion of the partitioning means shown in Fig. 5.

My invention may be embodied in an article of manufacture having a partible body, such as the body 1, of cheese, illustrated in the accompanying drawing, and a partitioning means therefor including a strand, such as the strand of linen thread 2, illustrated in the accompanying drawing. The cheese body 1 is of a size and shape that is conventional to commercial usages. The thread or string strand 2 may be connected to a means for moving the strand through the plastic body 1 to partition the same. Said strand moving means may be embodied in an integral extension part 4 of said strand 2, illustrated in the accompanying drawing or, if desired, the part 4 can be attached in some suitable manner to the strand. Said means may, also, include a gripping tab, such as the tab 5, which facilitates manual seizing of the extension part 4 and manipulation of the strand 2.

In the assembly shown in Figs. 1 to 4, inclusive, of the accompanying drawing, the strand 2 has a material length and is disposed in a plurality of bights, each of which encircles the body 1. In the arrangement shown in Figs. 1, 2, and 3, the bights formed by the strand 2 are disposed in substantially spiral continuity about the body 1, while in the arrangement shown in Fig. 4, the bights of the strand 2 form a plurality of half-hitches about the body 1. As is well known, the bight or noose of a half-hitch is closed by the intertwining and interengagement of the strand portions connected to the bight or noose forming portions. One of said interengaging portions is bent, at least partially, about the other interengaging portion to form a partial eye, on which the said other portion bears for engagement and through which it may run for relative movement of the interengaging portions, each with respect to the other, as the bight or noose is contracted. It is suggested in order to expeditiously apply the strand 2 in substantially spiral continuity shown in Figs. 1 and 2, that the body 1 may be set on a rotatable turntable and the strand 2 fed to said body from a suitable strand-feeding mechanism that may move in a direction parallel to the axis of rotation of said turntable, progressively with the rotation thereof to produce a desired pitch in the spiral application and lay of the strand on the body. The pitch with which the strand is applied will determine the spacing as between each successive bight in the strand, such as the space between bights 7 and 8, indicated in Fig. 2 and, thus, the thickness or size of each successive portion to be severed from the body, as will hereinafter be described. During the feeding of the strand 2 to the body 1, the strand is, preferably, maintained under a slight tension to produce a partial partition of the body 1, as illustrated at 9 in Fig. 1 of the drawing, and to locate a portion of the strand in said partial partition, as illustrated at 10 in Fig. 3. The strand 2 is, thus, embedded within the body 1 and will remain in its applied position without the further provision of an extraneous strand-supporting means. It is within my concept that the strand 2 may be associated with the body 1 in many other ways than that suggested above, such as by forming the body 1 about the strand 2 to embed the strand, or by inserting the strand through the body 1 and otherwise. My purpose in suggesting the above particular method of assembly, being to illustrate one of the many ways the article of manufacture herein claimed may be commercially produced.

The strand 2 of Figs. 1 to 3, inclusive, has an integral extension forming the strand-manipulating part 4 connected to the extension part 4. If desired, the body 1 and its associated strand 2 may be enclosed in a suitable commercial wrapper 3 formed of paper or the like so that a portion of the part 4 extends to the exterior of said wrapper. Preferably, the wrapper 3 is applied about the body 1 so that one edge 16 thereof underlies another edge or flap 17, the part 4 extending exteriorly between the edge 16 and flap 17. Preparatory to effecting partition of the body 1, the user lifts the flap 17 to completely expose the part 4. The user then merely grasps the enwrapped body 1, in one hand, and the part 4 and the tab 5, in the other hand, and draws the part 4 away from the body and in a direction substantially at a right angle to the central longitudinal axes of the curvilinear strand bights. As the part 4 is so drawn, the strand bight next adjacent to the part 4 gradually reduces in size and closes, as diagrammatically illustrated in Fig. 3 of the accompanying drawing, moving from its installed position, illustrated in full line and indicated at 11, to a position, illustrated in broken lines indicated at 12, and thence progressively to the positions indicated at 13 and 14 to ultimately divide or partition a piece or slice 15 from the body 1 by the snaring action produced by closing said bight of the strand 2. Each successive slice 15 may be formed by a continued drawing of the strand 2 in the same fashion to close successive bights in an orderly and progressive manner. The user may then lift the portion of the wrapper 3 adjacent to the flap 17, remove the slices 15 from within the wrapper 3 and thereafter replace the flap 17 so that the remaining unpartitioned portion of the body 1 and the wrapper 3 may remain intact. Thus, the body 1 may be partitioned without removing the body from the wrapper 3.

The strand 2, when applied to the body 1, as shown in Fig. 4 of the drawing, accomplishes a partitioning of the body 1 with much the same advantageous action heretofore described. It has been found that the slices produced by the strand 2. arranged as illustrated in Fig. 4, will have opposite faces which extend in planes extending at right angles to the central longitudinal axis of the body 1. Another advantage in the arrangement shown in Fig. 4 is that in the progression of the strand from the complete closure of one bight to a position to begin the closure of the next successive bight, the strand follows the path in which the portion 18, indicated in Fig. 4 of the drawing, of the strand 2 lays. This tends to produce even and duplicate slices from the body 1 without disfiguration of slice faces.

The commercial assembly of the strand 2 with the body 1, to establish the arrangement shown in Fig. 4, may be accomplished by feeding the body 1 through successive loops or bights of the strand 2 formed by a suitable strand-manipulating mechanism which may not only form the desired half-hitch bights but, also, exert sufficient tension on each bight to partially partition the body and dispose each bight in said line of partial partition and in a predetermined and desired spacial relation to each other.

Fig. 5 of the accompanying drawing, illustrates a modified form of the partitioning means of my invention wherein is provided a plurality of strands 2, each of which is disposed in encircling relation to the body 1 forming an individual bight disposed in a desired and predetermined spacial relation to each other. Each end of each strand 2 has an extension part 4 that may be conjointly tied in a running knot 19, wherein in one part 4 may form a loop, annulus, or eye through which the other part extends, best illustrated in Figure 6 of the accompanying drawing. The end of each part 4 may be connected to a tab 5, each of which may be formed from a portion of a scored blank. Thus, when it is desired to partition the body 1, shown in Fig. 5, the blank may be separated into the tabs 5 along its scored portion and the part 4 of the strand 2, extending through the looped, annulus or eye forming strand part 4, as shown in Fig. 6, may be drawn through the running knot 19 to partition a slice from said body 1. In order to retain the knot 19 in position, the other tab 5 may be manually grasped and retained while the strand 2 is being drawn through said knot 19. If desired, however, the blank forming the tabs 5 may be bodily grasped and the bighted strand 2 be pulled intact through the body 1 to effect the partition.

While in accordance with the provisions of the statutes, I have illustrated and described the best forms of my invention now known to me, those skilled in the art will readily understand that many changes may be made in the forms of construction disclosed, without departing from the spirit of my invention as set forth in the appended claims.

I claim:

1. An article of manufacture having a partible body; a strand for partitioning said body; the lay of the strand describing a plurality of body encircling bights; each bight engaging the body at spaced distances from the next adjacent bight; and means connected to the strand for moving the strand to successively close each bight and thereby partition the body into portions located on opposite sides of the plane through which the strand is moved to close the bight.

2. An article of manufacture having a partible body; a strand for partitioning said body; the strand wound about the body to form a plurality of spiral bights encircling the body and leading from one end of the body toward the other end of the body; and means connected to the strand for moving the strand to successively close each spiral bight and thereby partition the body into portions located on opposite sides of the plane through which the strand is moved to close the bight.

3. An article of manufacture having a partible body; a strand for partitioning said body; the lay of the strand describing a plurality of spaced body encircling bights, each bight including a running knot; and means connected to the strand for successively moving the strand describing each bight relative to the running knot thereof to successively close each bight and thereby partition the body into portions located on opposite sides of the plane through which the strand is moved to close the bight.

4. An article of manufacture having a partible body; a strand for partitioning said body, the lay of the strand describing a body encircling bight and a running knot; and means connected to the strand for moving the strand relative to the running knot to thereby close the bight and partition the body into portions located on opposite sides of the plane through which the strand is moved to close the bight.

5. An article of manufacture having a partible body; a strand for partitioning said body; the lay of the strand describing a plurality of bights, each bight encircling the body and spaced from the next adjacent bight; and means connected to the strand for moving the strand to successively close each bight and thereby partition the body into portions located on opposite sides of the plane through which the strand is moved to close the bight.

6. An article of manufacture having a partible body; a strand for partitioning said body; the lay of the strand describing a plurality of spaced body encircling bights, each bight having interengaging, relatively movable strand portions; and means connected to the strand for moving the strand describing each bight and the interengaging strand portions thereof relative to each other to successively close each bight and thereby partition the body into portions located on opposite sides of the plane through which the strand is moved to close the bight.

7. An article of manufacture having a partible body; a strand for partitioning said body, the lay of the strand describing a bight encircling said body and an annular eye through which one end of the bight-forming strand portion extends and may be substantially freely moved; and means connected to the strand for moving said end of the bight-forming portion relative to and through the annular eye-forming portion to constrict the bight and thereby partition the body into portions located on opposite sides of the plane through which the strand is moved to constrict the bight.

8. An article of manufacture having a partible body; an annulus; a strand for partitioning said body, the lay of the strand describing a bight encircling said body with at least one end thereof extending through the annulus for substantially unrestricted movement relative thereto; and means connected to said strand for moving the strand relative to the annulus to constrict the bight and thereby partition the body into portions located on opposite sides of the plane through which the strand is moved to constrict the bight.

9. An article of manufacture having a partible body; a strand for partitioning said body, having its ends entwined to form a single bow knot and a bow, the bow encircling the partible body; and means connected to the bow forming strand portions for moving said portions through the bow knot to constrict the bow and, thereby, partition the body into portions located on opposite sides of the plane through which the strand is moved to constrict the bow.

CALE J. SCHNEIDER.